United States Patent [19]

Pradon

[11] 4,000,808
[45] Jan. 4, 1977

[54] DEVICE FOR LOWERING BULK MATERIALS

[76] Inventor: Jacques Pradon, 19 Avenue des Tourelles, Saint-Maur-des-Fosses, France

[22] Filed: Mar. 12, 1976

[21] Appl. No.: 666,320

Related U.S. Application Data

[63] Continuation-in-part of Ser. No. 474,080, May 28, 1974, abandoned.

[30] Foreign Application Priority Data

June 6, 1973    France ............................ 73.20561

[52] U.S. Cl. ............................. 198/572; 198/604
[51] Int. Cl.² ....................................... B65G 43/08
[58] Field of Search ............. 198/36, 37, 110, 162, 198/165, 196

[56] References Cited

UNITED STATES PATENTS

| | | | |
|---|---|---|---|
| 1,761,065 | 6/1930 | Bausman ........................... | 198/165 |
| 2,836,285 | 5/1958 | Muller ................... | 198/165 |
| 2,928,523 | 3/1960 | Neidhardt .......................... | 198/196 |
| 2,966,253 | 12/1960 | Gerrans ............................. | 198/37 |
| 3,144,929 | 8/1964 | Carpenter .......................... | 198/165 |
| 3,319,776 | 5/1967 | Bechtloff et al. .................. | 198/165 |
| 3,545,597 | 12/1970 | Resener .............................. | 198/195 |
| 3,805,946 | 4/1974 | Yateman et al. .................. | 198/162 |

*Primary Examiner*—John J. Love
*Assistant Examiner*—Jeffrey V. Nase
*Attorney, Agent, or Firm*—Cameron, Kerkam, Sutton, Stowell & Stowell

[57] ABSTRACT

A device to lower bulk material from a supply level down to a discharge conveyor which device will avoid free falls of material when in operation such as would damage the material. The device includes a conveyor having a vertical run which defines a chimney from a point just below the supply level down to the discharge conveyor, the chimney speed and discharge conveyor speed being related to the supply to keep a body of material within the chimney supported by the discharge conveyor. The chimney is formed by two endless elements which come together and diverge at the top and bottom of the chimney.

9 Claims, 5 Drawing Figures

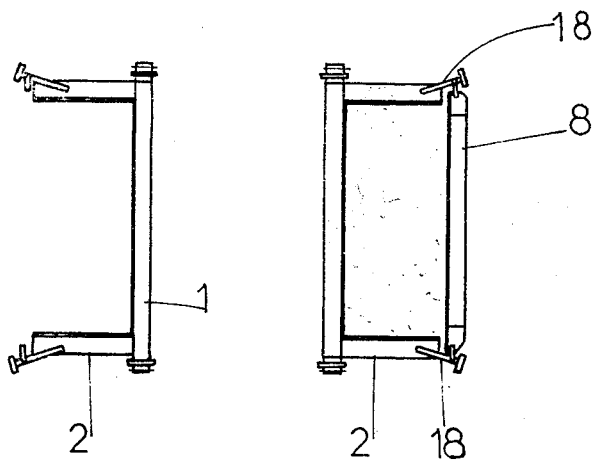
FIG:2
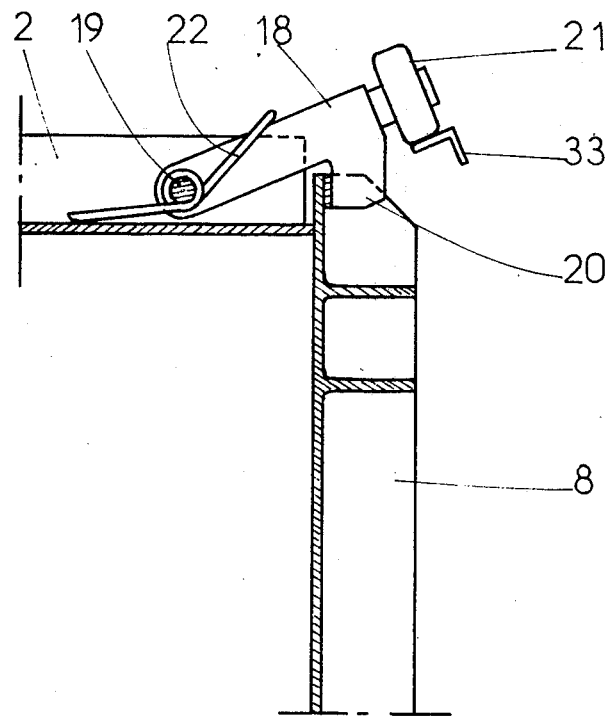
FIG:3

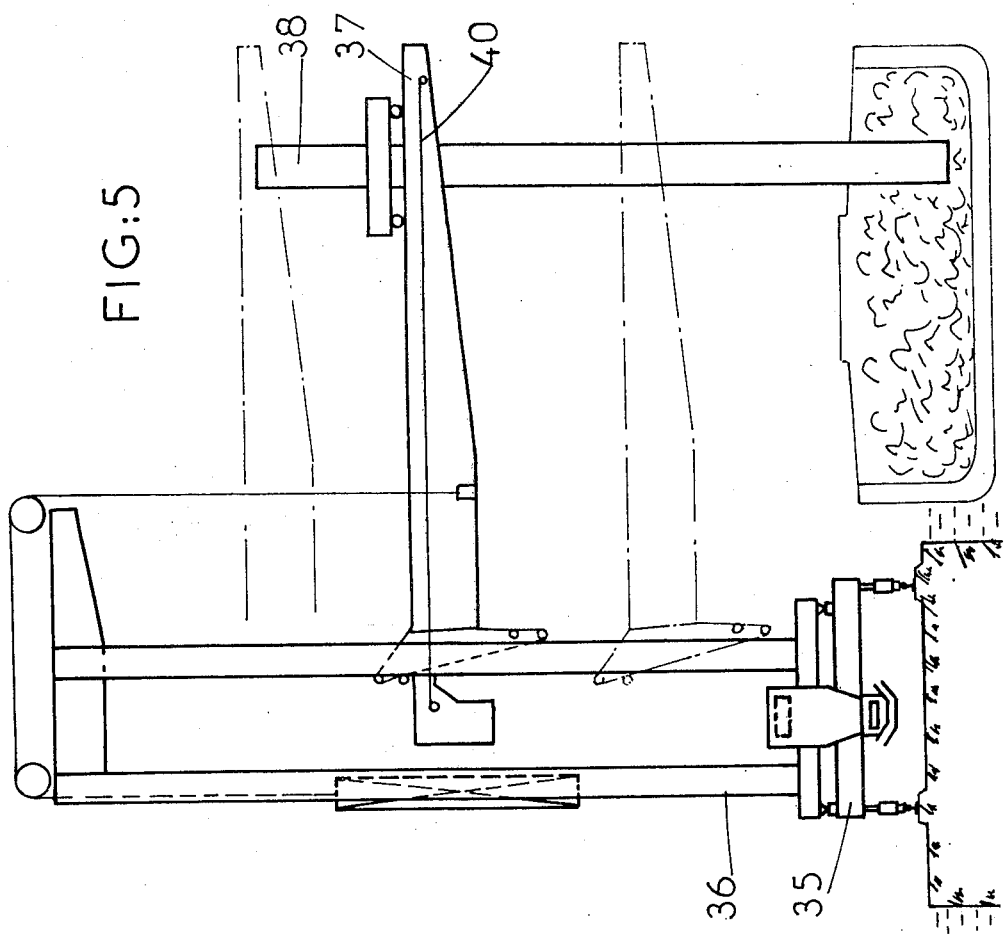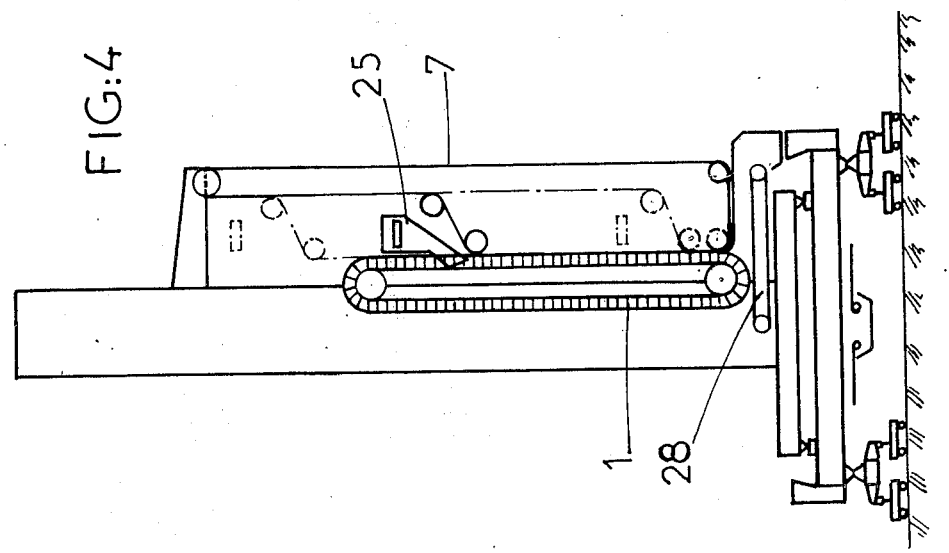

DEVICE FOR LOWERING BULK MATERIALS

REFERENCE TO RELATED APPLICATION

This application is a continuation-in-part application of my application Ser. No. 474,080, filed May 28, 1974 now abandoned.

BACKGROUND OF THE INVENTION

The present invention refers to a device intended for the continuous lowering of bulk products along substantially vertical tracks.

The invention finds application in any case of continuous lowering of bulk products when it is important to avoid shock or chrushing; this is the case, for example, in the loading or unloading of ore or coalships in order to avoid screened pieces of ore, coal or coke being reduced to fines by too great free falls.

At present various types of inclined conveyor are employed, belt, straight or spiral toboggan or fixed pipe.

Belt conveyors are heavy and bulky; in loading ports, for example, these conveyors occupy considerable space obstructing activities on the quay. Spiral toboggans have reduced bulk but the slope of the spiral must take into account the nature of the product conveyed in order to avoid either too rapid descent or clogging, which limits their employment. Further, they are subjected to rapid wear and high heating due to friction. Fixed pipes, substantially vertical, present the same disadvantages as toboggans (wear, free fall, or void-effect and clogging).

The present invention applies a rational solution to these problems.

It is applied to a device fed with bulk material at a fixed or variable upper level and having a lower discharged conveyor.

In accordance with the invention there is provided a device for continuously lowering a supply of bulk material from an upper level to a discharge conveyor at a lower level, the device comprising an endless conveyor having a rectilinear descending portion, the conveyor forming in said portion an open channel having rigid sides, means of closure of this channel in the descending portion lying between the upper level and the lower discharge level defining with the conveyor between the two levels a closed chimney having rigid descending walls, means of regulation of the speed of the vertical conveyor as a function of the material feed flow in order to keep the upper level of material in the chimney at a constant level, and means of regulating the speed of the discharge conveyor at a constant ratio to that of the vertical conveyor, this ratio being determined so that the flow from the discharge conveyor is equal to that of the vertical conveyor with its chimney filled with material.

The invention will now be described in greater detail by referring to a particular embodiment given by way of non-restrictive example and illustrated in the attached drawings.

FIG. 2 is a section along II—II in FIG. 1.

FIG. 3 is a detail of a lock illustrated in FIG. 2.

FIGS. 4 and 5 show an example of application of the device to an apparatus for the continuous unloading of ships.

Figure 1:
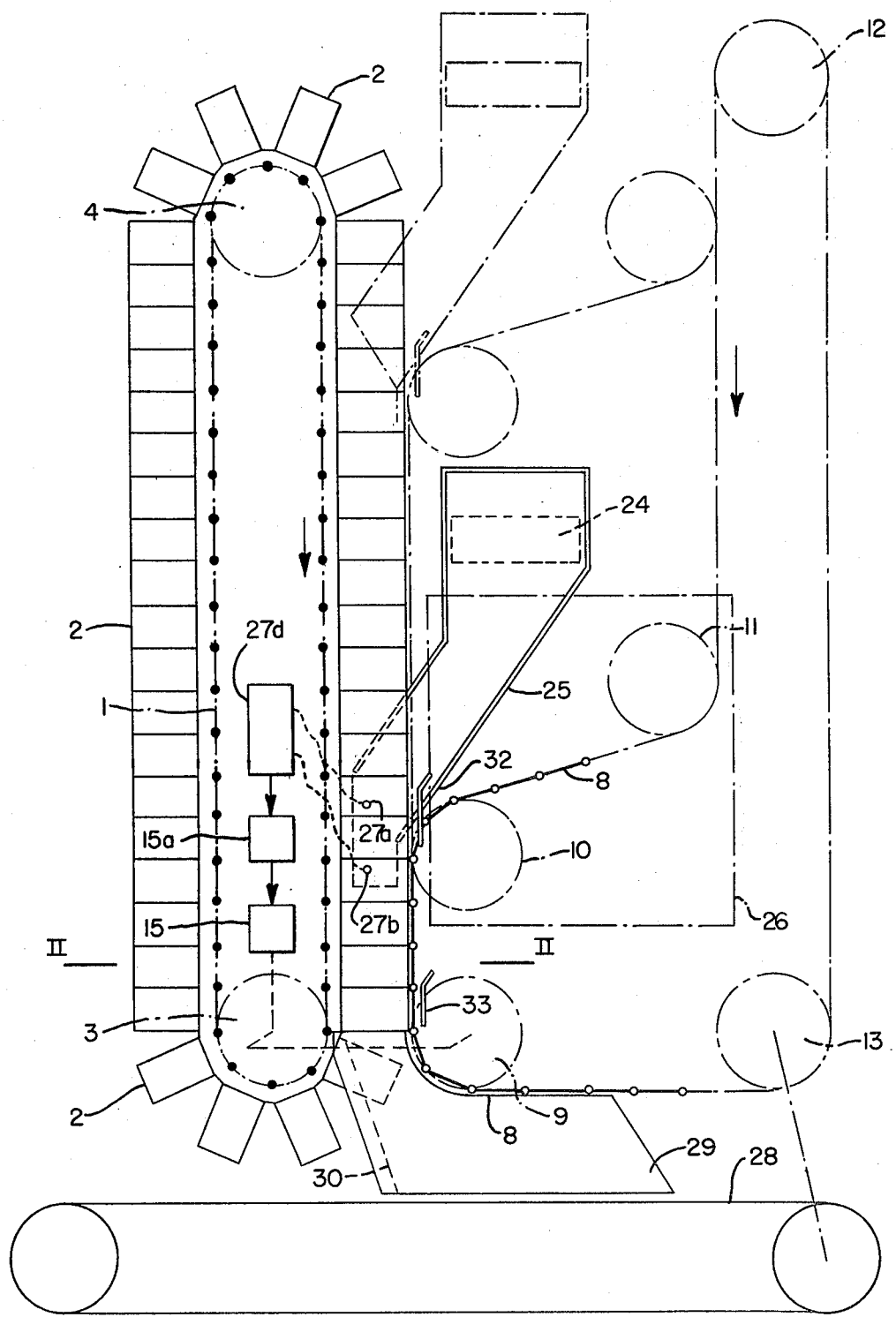
FIG. 1 shows a diagrammatic view of the whole of the device applied to the case where the upper feed level is variable.

Referring to FIGS. 1 and 2, the device comprises an endless conveyor 1 comprising articulated U-shaped elements 2 forming in its rectilinear portions a movable channel and driven by the driving pulley 3 with return by the pulley 4. An endless chain 7 consisting of plates 8 articulated to one another passes round the five pulleys 9 to 13 (one of which is the driving pulley) and comes to close the channel of the conveyor over the height lying between the pulleys 9 and 10. The pitch of the plate-chain 7 is the same as that of the conveyor 1 and the chain 7 runs around at the same linear speed as the chain bearing the U-shaped elements 2 by mechanical coupling of the driving pulleys 3 and 9. Further, the adjustment of the conveyor and chains is effected so that during rotation each plate 8 offers itself exactly in front of the open portion of an element 2. The pulleys 3 and 9 are driven together by a variable-speed driving mechanism indicated diagrammatically in FIG. 1 by the apparatus 15, it being understood that this variable-speed driving mechanism may be of an ordinary known type.

For example, a motor can be used having a speed variable in continuous fashion of known type with continuous current and controlled in regulation by a Thyristor or, for more simple installations, a two speed motor can be used. In the present embodiment, a two speed motor can be used with a normal speed corresponding to a flow of material in the chimney slightly less than normal for the installation and a more rapid speed for removal of the maximum amount of material fed by the conveyor 24. The assembly of the control relays for regulation of a motor 15 is included in the control box 15a.

It will be seen from FIGS. 2 and 3 that each plate 8 of the chain 7 comes and locks itself on to the mating element 2 of the conveyor 1 which they come into juxtaposition. For that purpose the lateral faces of each element 2 carry locks 18 in the form of hoods, hinged at 19 on to the U-shaped element and each furnished with a projecting portion 20. The locks 18 bear at their tips rollers 21 and are normally forced over towards the axis of the conveyor 1 by springs 22.

A horizontal feed-conveyor 24 associated with a hopper 25 tips the material into the chimney formed by the conveyor 1 and the plate-chain 7.

The hopper 25 includes a bottom extension which enters the chimney. The extension carries two sondes at levels 27a and 27b to detect the upper level and a lower level of the material. These sondes are of usual known type as for example ultrasonic sondes, capacitive base sondes, gamma ray sondes or even electromagnetic feelers. These two sondes are used with a two speed motor. However, if motor 15 is a conventional continuous variation speed motor, a single sonde 27a would be used providing a continuous analogous representative signal of the level of the products in the chimney. The signals of sondes 27 and 27a are analyzed in the apparatus in housing 27d and transmitted to the control box 15a for the motor.

The conveyor 24 is in this case itself movable vertically between the positions shown, one in full line and the other in dash-dot line in FIG. 1, which is the case as will be seen later when the conveyor is mounted on a movable horizontal boom of an apparatus for unloading ships. In this vertical movement the conveyor 24 is integral with the hopper 25 and the return-pulleys 10 and 11 of the plate-chain, the whole being carried by a common frame 26. At its lower portion the device is completed by a continuous discharge conveyor 28 associated with lateral guide cheeks 29 for the material and a scraper blade 30.

The speed of the conveyor 28 is at a constant ratio to that of the conveyor 1 and chain 7 and this ratio is determined in order to obtain a discharge flow from the conveyor 28 equal to the flow from the conveyor 1 when the chimney is full of material. When the two conveyors 1 and chain 7 run round in the normal direction indicated by the arrows the locks 18 of the elements 2 located above the hopper 25 on the descending strand are in the closed position forced over towards the centre under the action of the springs 22. On approaching the zone at which the plates 8 meet the elements 2 the rollers 21 on the locks encounter an opener-ramp 32 integral with the frame 26 which forces the locks to open against the springs 22. Each plate 8 can then come into direct contact with the mating element 2 and when the roller escapes at the lower portion of the ramp the lock 18 comes and locks the plate 8 on to the element 2 as illustrated in FIG. 3. In the same fashion the lower zone where the plate-chain separates from the conveyor 1 is preceded by another opener-ramp 33 which acts upon the rollers of the locks to open them and free the plates.

When the installation is started up the conveyors 1, chain 7 and conveyor 28 are kept at rest whilst the first of the material is tipped into the hopper 25 by the conveyor 24. This material falls through the empty chimney on to the conveyor 28 where it starts to pile up forming a slope; then as it is not discharged it comes progressively to fill the chimney. When the materials reach in the chimney the level of the interior sonde 27b the signal from this sonde controls the actuation of motor 15 at normal speed which drives chains 1 and 7 and conveyor 28. There is then established a continuous amount of material in the chimney and on conveyor 28.

In the chimney this material moves downwards at the same linear speed as the walls 2 and 8 of the chimney with the result that there is no relative movement of the material with respect to the walls and hence no abrasion of the latter. Similarly there is no possibility of void-formation in the chimney and the flow remains continuous. During operation, the slow speed of motor 15 corresponds to an amount of material slightly less than the normal amount in the chimney and the level would tend to rise slightly in the chimney. When the material reaches the level of upper sonde 27a the signal from this sonde will shift the motor to higher speed thus increasing the amount of removal of material and results in a lowering of the level of material in the chimney until the level again reaches the level of lower sonde 27b which will return the motor to slow speed. The number of sondes and the number of speeds of the motor can be multiplied if a more exact regulation is desired or a type of sonde could be utilized having a signal varying in continuous manner associated with a motor having a continuously varying speed. The result of this is that the height of fall of the material remians constant and limited practically to the height of the hopper 25, a height which is insufficient to cause a risk of crushing and the reduction of screened pieces into fines.

It will be observed again that if the level of the conveyor 24 varies even in the course of feeding, no disturbance will result from it, because the level-gauge will act upon the discharge speeds to re-establish the upper level of the material in the chimney at a constant level with respect to the hopper 25.

Reference will now be made to FIGS. 4 and 5 for an example of utilization in which the device shows itself as particularly effective. The device is here applied to an apparatus for continuous unloading of ships which was the object of the French Patent No. 2,187,653. An apparatus of this kind comprises mainly a bearer frame 35 traversable along a quay and supporting an orientatable tower 36 of great height. A horizontal boom 37 is movable up and down the vertical tower and supports a bucket elevator 38 the bottom of which goes down into the hold of the ship 39. A conveyor 40 brings the material tipped from the elevator across to the tower.

Having regard to the size of ships concerned and the rise and fall of the tides the boom 37 and the conveyor 40 may be at a very great height and the problem consists in letting the material come down to the foot of the tower without a considerable free fall, without a bulky device and without the risk of abrasion of the members employed.

FIG. 4 shows the device of FIGS. 1 to 3 arranged laterally on the tower, which enables the material to be brought to the foot of the tower with the same safety whatever the height of the boom 37.

The device as described above in a preferred embodiment of the invention is conceived and intended for the handling of products over heights which may vary. When the drops are constant, in an industrial building, for example, for handling usually between two fixed levels, a simplified variant can be employed.

For such use the feed conveyor is fixed and located at the head of the device and the plate-chain can be replaced by a simple endless metal strip between two end pulleys located at the same levels as the pulleys of the channel-conveyor; the descending chimney is thus created by the association of the elements of the two conveyors over the whole height of these conveyors. The clamping locks can therefore be replaced by vertical ramps which form a guideway and keep the strip up against the U-elements.

Of course the scope of the invention is not limited solely to the embodiments described above by way of non-restrictive example but likewise covers any variants which might differ only in detail or by the use of equivalent means.

Thus the plate chain 8 might be free on its pulleys, the driving and synchronization of it with the conveyor 1 being directly ensured by the locks 18; it would be sufficient for that purpose if each plate 8 had a stop mated with each lock 18 for transmission of the driving force.

One might similarly without departing from the scope of the invention conceive of an equivalent device in which the lowering device comprises no more than one single endless belt conveyor forming a channel each U-shaped element of which has its own closure means which consists of a flap hinged to one of the sides of the element and a locking device carried by the other side. A lateral ramp mounted underneath the feed hopper tilts the flaps into the closed position as they present themselves. At the bottom of the device a second ramp unlocks the flaps which are kept open by a suitable device (lock or torsion spring) until they again meet the closer-ramp. Without changing the nature of the invention regulation can be provided by weighing upstream of the feed hopper; detection of a variation in flow automatically brings about the corresponding variation of the lowering and discharge speeds. The weighing will be effected at a distance sufficiently upstream for the system to have time to overcome its own inertia.

What I claim is:

1. A device for continuously lowering a supply of bulk material from an upper level and for removal by a discharge conveyor at a lower level, comprising an endless moving conveyor, a vertical rectilinear descending portion for said endless moving conveyor, said endless moving conveyor forming in said descending portion an open channel, rigid sides forming said channel, means for closing said channel in said descending portion between the upper level and the lower level, said means defining with said endless moving conveyor between the two levels a closed chimney having rigid descending walls, means for regulating the speed of movement of said endless moving conveyor as a function of the height of material in said chimney to maintain an upper level of material in said chimney at a constant level when said discharge conveyor receives material from said chimney and means for regulating the speed of movement of said discharge conveyor at a constant ratio to that of said endless moving conveyor whereby the flow from said discharge conveyor is equal to the flow from said endless moving conveyor when said chimney is filled with material.

2. A device as in claim 1, including U-shaped elements having open portions coupled together as an endless chain forming said endless moving conveyor, said U-shaped elements being laterally contiguous in said rectilinear portion of said endless moving conveyor.

3. A device as in claim 2, said means for closing said channel including an endless chain of plates each of dimension to mate with said open portion of the adjacent one of said U-shaped elements of said endless moving conveyor, said plate chain having a descending strand parallel with and adjacent to said rectilinear descending portion of said endless moving conveyor and means for driving said plate chain in linear synchronism with said endless moving conveyor.

4. A device as in claim 3, including an upper pulley for said chain strand parallel with and adjacent to said endless moving conveyor and means for positioning said upper pulley to vary the length of said chain strand.

5. A device as in claim 3, including means for locking each of said plates of said plate chain to the adjacent U-shaped element.

6. A device as in claim 5 including guide ramps for actuating said locking means.

7. A device as in claim 3, wherein said means for providing linear synchronism between said endless moving conveyor and said plate chain by direct driving of said plate chain by said U-shaped elements including members locking the one to the other.

8. A device as in claim 1, wherein said means for closing said channel include flaps hinged on the rigid sides of said endless moving conveyor and movable to overlie the opening defined by thos sides. those 9. A device as in claim 1 wherein said means for regulating the speed of said endless moving conveyor include a level gauge in said chimney.

* * * * *